United States Patent
Li et al.

(10) Patent No.: US 9,150,441 B2
(45) Date of Patent: Oct. 6, 2015

(54) WASTE WATER TREATMENT EQUIPMENT

(76) Inventors: Jinmin Li, Linyi (CN); Liankui Zhou, Linyi (CN); Dayong Li, Linyi (CN)

( * ) Notice: Subject to any disclaimer, the term of this patent is extended or adjusted under 35 U.S.C. 154(b) by 604 days.

(21) Appl. No.: 13/512,435

(22) PCT Filed: Dec. 1, 2010

(86) PCT No.: PCT/CN2010/079325
§ 371 (c)(1),
(2), (4) Date: May 29, 2012

(87) PCT Pub. No.: WO2011/066791
PCT Pub. Date: Jun. 9, 2011

(65) Prior Publication Data
US 2012/0228204 A1  Sep. 13, 2012

(30) Foreign Application Priority Data

| Dec. 1, 2009 | (CN) | 2009 1 0249722 |
| Jan. 15, 2010 | (CN) | 2010 1 0000737 |
| Nov. 3, 2010 | (CN) | 2010 1 0531226 |

(51) Int. Cl.
| C02F 1/52 | (2006.01) |
| B01D 21/01 | (2006.01) |
| B01D 21/24 | (2006.01) |
| B01D 21/00 | (2006.01) |
| B01D 21/02 | (2006.01) |

(52) U.S. Cl.
CPC ............. *C02F 1/52* (2013.01); *B01D 21/003* (2013.01); *B01D 21/0045* (2013.01); *B01D 21/01* (2013.01); *B01D 21/10* (2013.01); *B01D 21/2411* (2013.01)

(58) Field of Classification Search
CPC .......... C02F 1/52; C02F 1/5281; C02F 11/14; B01D 21/003; B01D 21/01; B01D 21/2411; B01D 21/0045; B01D 21/10; B01D 21/16
See application file for complete search history.

(56) References Cited

U.S. PATENT DOCUMENTS 4,273,658 A * 6/1981 Karman ...................... 210/709
4,303,517 A   12/1981 Love et al.
(Continued)

FOREIGN PATENT DOCUMENTS

| CN | 1400174 A | 3/2003 |
| CN | 1433976 A | 8/2003 |

(Continued)

*Primary Examiner* — Lucas Stelling
(74) *Attorney, Agent, or Firm* — Novick, Kim & Lee, PLLC; Allen Xue

(57) ABSTRACT

A sewage treatment apparatus comprises a first stage equipment for treating sewage feed to obtain a first effluent and a second stage equipment for treating the first effluent to obtain a second effluent. The second stage equipment comprises a mixer (VI) for mixing the first effluent and a flocculation agent to obtain the first effluent containing the flocculation agent and a flocculation-clarification equipment (VII) comprises a first flocculation reaction chamber (A), into which the first effluent containing the flocculation agent is entered and subjected to flocculation reaction to form a mixture of water and dreg; a first separation chamber (C), into which the mixture of water and dreg from the first flocculation reaction chamber (A) is entered and separated to obtain a first part of the second effluent and a first dreg; and a second separation chamber (D), into which part of the first dreg is entered and separated to obtain a second part of the second effluent and a second dreg.

20 Claims, 3 Drawing Sheets

(56) References Cited

U.S. PATENT DOCUMENTS

| | | |
|---|---|---|
| 7,452,469 B1 | 11/2008 | Kim |
| 2002/0158025 A1* | 10/2002 | Streat ............................ 210/738 |
| 2008/0185321 A1* | 8/2008 | Beaulieu ......................... 210/88 |
| 2011/0192780 A1* | 8/2011 | Beaulieu ....................... 210/202 |

FOREIGN PATENT DOCUMENTS

| | | |
|---|---|---|
| CN | 1504430 A | 6/2004 |
| CN | 201168466 Y | 12/2008 |
| JP | H05-85403 U | 11/1993 |
| JP | H07-204657 A | 8/1995 |
| JP | H08-155488 A | 6/1996 |
| JP | 2000-202492 A | 7/2000 |
| JP | 2009-066508 A | 4/2009 |
| JP | 2009-274008 A | 11/2009 |
| WO | WO90/10597 | 9/1990 |
| WO | WO 2007083053 A2 * | 7/2007 |

* cited by examiner

WASTE WATER TREATMENT EQUIPMENT

The present application claims the priorities of the following patent applications: (1) Chinese patent application 200910249722.X, filed on Dec. 1, 2009; (2) Chinese patent application 201010000737.5, filed on Jan. 15, 2010; and (3) Chinese patent application 201010531226.6, filed on Nov. 3, 2010. The contents of these patent applications are incorporated into the present application by reference.

TECHNICAL FIELD

The present invention relates to a sewage treatment apparatus, comprising: a first stage for treating a sewage feed to obtain a first water effluent, and a second stage for treating the first water effluent to obtain a second effluent, wherein the second stage comprises a mixing device for mixing the first water effluent and a flocculation agent to obtain the first water effluent containing flocculation agent and a flocculation clarification device.

BACKGROUND ART

Municipal sewage treatment standards of China have three levels, i.e., primary treatment, secondary treatment and tertiary treatment. Primary treatment is to remove suspended solids in sewage by physical methods such as sedimentation, floatation, filtration, or to primarily clarify strong acids, strong bases and over-rich toxic substances in sewage by chemical methods such as agglomeration, oxidation, neutralization, etc., so as to provide suitable water quality conditions for secondary treatment. Secondary treatment is to further treat sewage by biochemical function on the basis of primary treatment. Tertiary treatment is to treat water according to water feed quality by a corresponding method such as coagulation sedimentation, activated carbon filtration, reverse osmosis, ion exchange and electrodialysis on the basis of secondary treatment.

Sewage biotreatment belongs to secondary treatment, aiming at removing unprecipitable suspended solids and soluble biodegradable organics, which processes can be varied, including activated sludge method, AB method, A/O method, $A^2/O$ method, SBR method, oxidation ditch method, oxidation pond method, land treatment method, etc. In the process of sewage biotreatment, temperature has comprehensive influences on microorganisms, and most microorganisms in sewage treatment have an optimum growing temperature ranging 20-30° C. Since temperature changes upon climate, temperature control is difficult in either economic or engineering aspects.

Sewage after secondary treatment still contains phosphorus, nitrogen and non-degradable organic, minerals, pathogens, and needs further purification (i.e., tertiary treatment) to remove contaminants. Although sewage tertiary treatment not only reduces pollution of wastewater discharge on environment, but also save water resources. However, both capital expenditure and operating cost of sewage tertiary treatment are relatively high, about 2-3 times the sewage secondary treatment plant of the same scale, so that its development and application are limited.

Traditional sewage treatment processes purify sewage and gather contaminants in sludge merely by biologic degradation and conversion as well as solid-liquid separation, the sludge comprising primary sludge generated in primary treatment section, residual sludge (excessive sludge) generated in secondary treatment section, and chemical sludge generated in tertiary treatment section. Since these kinds of sludge contain a large amount of organics and pathogens and are easy to corrupt and stink, they may result in secondary pollution. Hence, sludge usually must be subjected to volume reduction, amount reduction, stabilization, harmless treatment and appropriate treatment. Common sludge reduction methods comprise digestion methods (including anaerobic digestion and aerobic treatment), sludge thermal treatment methods such as wet oxidation methods, sludge concentration methods such as gravity concentration methods and air flotation concentration methods, sludge dewatering methods such as mechanical dewatering and chemical coagulation methods, sludge drying methods such as natural drying methods and oven drying methods. However, these sludge reduction methods do not completely solve the problems of sludge discharge.

Flocculation clarification apparatus (also called as: clarification apparatus, clarifier, clarification basin, flocculation sedimentation basin, coagulation basin, etc.) is to combine and complete two processes, flocculation reaction (also called as: coagulation reaction) and sedimentation, in one structure, so as to use mature floc to contact and flocculate contaminant particles, thereby separating them from water. Among common flocculation clarification apparatuses, mechanical agitation clarifier is difficult to achieve uniform mixing because of the presence of short pass water flow and the entire concentric circle movement of water body; suspension clarifier is a dreg-suspended type clarifier, which is sensitive to factors such as water inflow, water temperature, has instable treatment effects and low water production rate; hydraulic circulation clarifier uses water flow of water ejector to perform mixing and achieve dreg circulation and reflow, but traditional hydraulic circulation clarifier has poor adaptability to water quality and water temperature, is unstable in running, difficult in dreg return control, and high head loss and energy consumption.

Hence, novel sewage treatment apparatus, especially sewage treatment apparatus capable of performing sewage tertiary treatment, is still in need to meet the continuously increasing requirements of sewage treatment.

CONTENTS OF THE INVENTION

One aspect of the present invention provides a sewage treatment apparatus, comprising: a primary stage for treating a sewage feed to obtain a first water effluent, and a secondary stage for treating the first water effluent to obtain a second water effluent, wherein the secondary stage comprises a mixing device for mixing the first water effluent with a flocculation agent to obtain the first water effluent containing flocculation agent, and a flocculation clarification device, the flocculation clarification device comprises a flocculation reaction chamber allowing the entrance and flocculation reaction of the first water effluent containing flocculation agent to form a mixed liquor of dreg and water, a first separating chamber allowing the entrance and separation of the mixed liquor of dreg and water from the flocculation reaction chamber to obtain a first part of the second water effluent and a first dreg, and a second separation chamber allowing the entrance and separation of a first part of the first dreg to obtain a second part of the second water effluent and a second dreg.

Commonly used flocculation agents comprise two types of flocculation agents: metal salts and polymers. The former are, as examples, aluminum sulfate, ferric trichloride and ferrous sulfate; and the latter are, as examples, polyaluminum chloride and polyacrylamide.

According to some embodiments of the sewage treatment apparatus of the present invention, the flocculation clarification device further comprises: one or more first dreg discharging channels fluidly communicating the first separation chamber and the second separation chamber to allow the entrance of a first part of the first dreg into the second separation chamber, and one or more first dreg returning channels fluidly communicating the first separation chamber and the flocculation reaction chamber to allow the entrance of a second part of the first dreg into the flocculation reaction chamber, wherein in the first separation chamber, the inlet of the first dreg discharging channels is at a position higher than the inlet of the first dreg returning channels.

In some embodiments, the position of the inlet of the first dreg discharging channels in the first separation chamber is defined by the lowest dreg-water interface in the first separation chamber.

The so-called "dreg-water interface" refers to a factitiously defined interface between clean water layer and dreg layer during the sedimentation procedure of the mixed liquor of dreg and water. For example, the dreg-water interface has a critical turbidity value, the clean water layer has a turbidity value lower than or equal to the critical turbidity value, while the dreg layer has a turbidity value higher than or equal to the critical turbidity. In the present invention, the critical turbidity value, expressed in NTU-scattering turbidity unit, is less than 100, preferably less than 10, more preferably less than 5. The so-called lowest dreg-water interface refers to the lowest position that can be reached by the dreg-water interface of the first separation chamber during its descent caused by introducing the first dreg into the second separation chamber. The lowest dreg-water interface can be determined in design according to the dreg-water separation capacity of the first separation chamber. In some cases, it can be determined by further considering the capacity of the flocculation reaction chamber for carrying out the flocculation reaction as well as other factors. Typically, the lowest dreg-water interface can be set at the bottom of the first separation chamber.

In some embodiments, the position of the inlet of the first dreg discharging channels is preferably higher than the position of the inlet of the first dreg returning channels. For example, when the bottom of the first separation chamber is also used as the top of the second separation chamber and is an inclined plane, the position of the first dreg discharging channels can be set on the inclined plane or extended to the first separation chamber so as to be higher than the inlet of the first dreg returning channels. In this case, when substantially all of the first dreg above the position of the inlet of the first dreg discharging channels (even may comprise a part of the second water effluent) enters into the second separation chamber, i.e., when the lowest dreg-water interface of the first separation chamber is reached, a second part of the first dreg returning to the flocculation reaction chamber is still sufficient to complete flocculation reaction, and the second separation chamber is disposed to provide a sufficient dreg-water capacity to obtain the second part of the second water effluent and the second dreg.

In some embodiments, in the first separation chamber, the position of the inlet of the first dreg discharging channels, especially its position at vertical direction can define the lowest dreg-water interface by the regulation of a regulating device. For example, when the inlet of the first dreg discharging channels is a slot, the position of the inlet of the first dreg discharging channels, especially the position thereof at vertical direction, can be elevated or lowered by opening or closing the slot. For another example, when the inlet of the first dreg discharging channels is a port of a scalable or bendable conduit, the position of the inlet of the first dreg discharging channels, especially the position thereof at vertical direction, can be elevated or lowered by scaling or bending the conduit.

Thus, the flocculation clarification apparatus can not only increase the output of the second water effluent (i.e., clean water), but also avoid the limitation of the separation capacity of the first separation chamber to the total water yield, thereby sufficiently utilizing the capacity of the flocculation reaction chamber, improving the adaptability of the flocculation clarification apparatus to changes of conditions such as water quality and temperature, so that stable running can be achieved under various conditions, the drawbacks of conventional hydraulic circulation clarification basin are overcome, and the apparatus can be used in large scale water treatment apparatus.

According to some embodiments of the sewage treatment apparatus according to the present invention, the second separation chamber has one or more channels for discharging a second part of the second water effluent so as to allow the second part of the second water effluent being discharged from the second separation chamber, the relative position between the inlet of the channels for discharging the second part of the second water effluent in the second separation chamber and the outlet of the first dreg discharging channels is disposed so that the suspended solids in the first part of the first dreg are subjected to sufficient sedimentation to obtain the second part of the second water effluent that substantially does not contain suspended solids, preferably, the inlet of the channels for discharging the second part of the second water effluent and the outlet of the first dreg discharging channels are arranged in staggered manner on a horizontal plane and/or vertical plane and/or a baffle board is set between the inlet of the channels for discharging the second part of the second water effluent and the outlet of the first dreg discharging channels. The inlet of the first dreg and the inlet of the channels for discharging the second part of the second water effluent are disposed to increase the distance for fluid flowing between each other and reduce the disturbance of the first part of the first dreg entering the second separation chamber on the second part of the second water effluent and the second dreg, thereby ensuring the effect of dreg-water separation, improving the water quality of the second water effluent, and reducing the water content of the second dreg.

In some embodiments, the outlet for discharging the first dreg can be appropriately disposed on the top of the second separation chamber, wherein the top of the second separation chamber is preferably the bottom of the first separation chamber, more preferably, the outlet of the first dreg discharging channels can extend downward and enter the internal part of the second separation chamber. For example, when one outlet of the first dreg discharging channels and one inlet of the channels for discharging the second part of the second water effluent are disposed on the top of the second separation chamber having round or square shape, they can be disposed in opposite manner to have maximum distance between each other. When two outlets of the first dreg discharging channels and two inlets of the channels for discharging the second part of the second water effluent are disposed on the top of the second separation chamber having round or square shape, they can be disposed in an interval manner between each other and uniformly on the top of the second separation chamber. For example, the two inlets of the channels for discharging the second part of the second water effluent can be disposed at two opposite edges, while the two outlets of the first dreg discharging channels are disposed at the other two opposite edges. In some cases, the outlets of the first dreg discharging channels can be disposed at a position depart away the edges. When the outlet of the first dreg discharging channels extends downward and enters the internal part of the second separation chamber, it can be disposed at any position in the second separation chamber, even at a middle or bottom position of the second separation chamber, as long as the dreg-water separation in the second separation chamber is not influenced. In some cases, a baffle board can be set between the outlet of the first dreg discharging channel and the inlet of the channels for discharging the second part of the second water effluent, so as to increase the distance the fluid flows from the outlet of the first dreg discharging channels to the inlet of the channels for discharging the second part of the second water effluent, thereby further enhancing dreg-water separation.

In some embodiments of the sewage treatment apparatus according to the present invention, the first dreg returning channels are also used channels allowing the mixed liquor of dreg and water in the flocculation reaction chamber enter into the first separation chamber, preferably, the first dreg returning channels are also used as the only channels allowing the mixed liquor of dreg and water in the flocculation reaction chamber enter into the first separation chamber. Thus, the channels the second part of the first dreg returns to the flocculation reaction chamber are also the channels the mixed liquor of dreg and water in the flocculation reaction chamber enters into the first separation chamber, this results in the counter current contact between the second part of the first dreg and the mixed liquor of dreg and water, thereby enhancing the compact and absorption between suspended particles, and further improving flocculation clarification effects.

According to some embodiments of the sewage treatment apparatus according to the present invention, the first separation chamber and the second separation chamber are disposed to allow the first part of the first dreg enter into the second separation chamber under gravity effect, preferably, the first separation chamber is located above the second separation chamber and the first separation chamber and the second separation chamber share the same side wall. In this case, occupied area is reduced, and space is sufficiently used, thereby reducing equipment investment.

According to some embodiments of the sewage treatment apparatus according to the present invention, the volume of the second separation chamber is about equal to or greater than the volume of the first separation chamber, preferably about equal to or greater than the volume of the first separation chamber.

According to some embodiments of the flocculation clarification apparatus, the first separation chamber is disposed to allow the second part of the first dreg return to the flocculation reaction chamber.

According to some embodiments of the sewage treatment apparatus according to the present invention, the flocculation reaction chamber comprises: a first flocculation reaction chamber and a second flocculation reaction chamber, wherein the first flocculation reaction chamber is disposed to allow the raw sewage containing flocculation agent and the first part of the mixed liquor of the second flocculation reaction chamber enter and perform flocculation reaction to form the mixed liquor of the first flocculation reaction chamber, the second flocculation reaction chamber is disposed to allow the mixed liquor of the first flocculation reaction chamber and optional a second part of the first dreg enter and perform flocculation reaction to form the mixed liquor of the second flocculation reaction chamber, and the second part of the mixed liquor of the second flocculation reaction chamber as a mixed liquor of dreg and water enters the first separation chamber.

According to some embodiments of the present invention, the first flocculation reaction chamber is a water ejector, wherein the water ejector comprises a nozzle and a throat to allow the raw sewage containing flocculation agent and the first part of the mixed liquor of the second flocculation reaction chamber enter and be mixed, and a reaction chamber to allow flocculation reaction. According to some embodiments of the sewage treatment apparatus of the present invention, wherein the water ejector further comprises a device for regulating the space between the nozzle and the throat so as to control the flow rate of the first part of the mixed liquor of the second flocculation reaction chamber.

According to some embodiments of the present invention, the first flocculation reaction chamber is a rotational flow generator, wherein the rotational flow generator comprises a tangential inlet to allow the raw sewage containing flocculation agent enter and generate rotational flow, an opening to allow the first part of the mixed liquor of the second flocculation reaction chamber enter, and a reaction chamber allow flocculation reaction occur, wherein the tangential inlet and the opening are disposed to allow the raw sewage containing flocculation agent and the first part of the mixed liquor of the second flocculation reaction chamber mix and perform flocculation reaction in the rotational flow generator. According to some embodiments of the sewage treatment apparatus according to the present invention, the rotational flow generator further comprises a device for regulating the size of the opening so as to control the flow rate of the first part of the mixed liquor of the second flocculation reaction chamber. According to some embodiments of the present invention, one or more openings are set at the bottom of the rotational flow generator, wherein the one or more openings have a device for regulating dreg flow rate, for example, a flow rate control valve or a curtain board to regulate the size of the opening. When there are several openings, the dreg flow rate can be simply regulated by closing one or more of the openings. In some embodiments, the tangential inlet and the opening are disposed to close to the bottom of the second flocculation reaction chamber so as to minimize the dreg accumulation in the lower part of the second flocculation reaction chamber.

According to some embodiments of the sewage treatment apparatus of the present invention, the second part of the first dreg returns to the second flocculation reaction chamber, preferably returns to the lower part of the second flocculation reaction chamber.

According to some embodiments of the sewage treatment apparatus of the present invention, one or more kinds of grid and/or packing material are set in the first flocculation reaction chamber and/or the second flocculation reaction chamber to enhance the generation of vortex, especially micro vortex. The examples of the grid comprise grate or multilayer small mesh screen. The examples of the packing material comprise vertex generator, such as the micro-vertex generator of CN201046927A, and polyhedron shape network cage flocculation reaction module.

According to some embodiments of the sewage treatment apparatus of the present invention, one or more guide vanes, such as spiral guide vanes, are set in the first flocculation reaction chamber and/or the second flocculation reaction chamber to enhance the generation of vertex, especially the generation of micro-vertex.

According to some embodiments of the sewage treatment apparatus of the present invention, the first separation chamber is disposed to locate in the second flocculation chamber, for example, the second separation chamber can be disposed to encircle or surround the first flocculation reaction chamber.

According to some embodiments of the sewage treatment apparatus of the present invention, the second separation chamber is disposed to locate below the first separation chamber and the second flocculation reaction chamber, preferably the top of the second separation chamber is used as the bottom of the second flocculation reaction chamber and the first separation chamber.

According to some embodiments of the sewage treatment apparatus of the present invention, the first flocculation reaction chamber and the second flocculation reaction chamber independently have a cross section in round shape or polygonal shape, such as trigon, tetragon, pentagon, hexagon, heptagon, or octagon, preferably the first flocculation reaction chamber has a cross section in round shape, and the second flocculation reaction chamber has a cross section in round shape or square shape.

According to some embodiments of the sewage treatment apparatus of the present invention, one or more inclined pipe zones and/or inclined plate zones are set in the first separation chamber and/or the second separation chamber. The inclined pipe or inclined plate can enhance the sedimentation of fine particles, so as to ensure the sedimentation effects and clarification efficiency of the clarification basin, and provide a higher hydraulic load.

According to some embodiments of the sewage treatment apparatus of the present invention, a device such as overflow device for discharging a first part of the second water effluent can be set at the upper part of the first separation chamber; and a device such as drain pipe for discharging a second part of the second water effluent can be set at the upper part of the second separation chamber.

According to some embodiments of the sewage treatment apparatus of the present invention, the top of the flocculation clarification apparatus can be open or close, preferably, the top of rotational flow clarifier is close or the rotational flow clarifier is placed in a close building to avoid environmental influence, especially the algal growth caused by illumination and contaminants of around environment. In some embodiments, the flocculation clarification further comprises a shielding device to reduce the algal growth caused by illumination and contaminants of around environment.

As compared to conventional clarification apparatus, the flocculation clarification can effectively enhance dreg-water separation, increase clean water yield, and reduce process water consumption. When the mixture of the first water effluent and a flocculation agent tangentially enters the rotational flow generator, less head loss and quick and uniform mixing are achieved. In addition, the first separation chamber separates the second separation chamber from the flocculation reaction chamber, thereby avoiding the disturbance of the mixed liquor of dreg and water in the flocculation reaction chamber to the dreg-water separation in the second separation chamber and thus improving the efficiency and effect of dreg-water separation. In the meantime, the flocculation clarification apparatus of the present invention can control the dreg-water interface in the first separation chamber by the position of the first dreg outlet, so that the operation and control are simplified, and the equipment investment and operation cost are significantly reduced.

The use of the flocculation clarification apparatus can substantially increase flocculation reaction efficiency, shorten flocculation time, reduce reagent consumption, increase sedimentation separation efficiency and solid content of dreg, because it has merits of quick mixing, short reaction time, high flow speed, less head lose. Hence, it has a reduced capital investment, stable operation, good compact load resistance, high clean water quality and reduced water production cost.

According to some embodiments of the sewage treatment apparatus of the present invention, the primary stage is a device capable of performing sewage biotreatment of the sewage feed in a manner according to Wuhrmann process, A/O process, Bardenpho process, Phoredox process, $A^2/O$ process, reversed $A^2/O$ process, UCT process, MUCT process, VIP process, OWASA process, JHB process, TNCU process, Dephanox process, BCFS process, MSBR process, SBR process, AB process, oxidation ditch process, biomembrane process, moving bed process or a combination thereof.

According to some embodiments of the sewage treatment apparatus, the primary stage comprises a pretreatment section and a treatment section, the pretreatment section comprises a first aeration basin and a first sedimentation basin, wherein the first aeration basin is disposed to allow the sewage feed mix with a first sludge from the first sedimentation basin, optionally a second sludge from the treatment section and optionally the second dreg from the secondary stage at a first end of the first aeration basin to obtain a first mixed liquor, and allow the aeration of the first mixed liquor to obtain a second mixed liquor at a second end of the first aeration basin; the first sedimentation basin is disposed to allow the separation of the second mixed liquor from the first aeration basin to obtain a supernatant and a first sludge, and allow at least part of the first sludge return to the first end of the first aeration basin to have a sludge age of greater 50 days, preferably greater than 100 days, more preferably greater than 300 days, more preferably greater than 1000 days, more preferably greater than 2000 days, and more preferably greater than 5000 days; and the treatment section is disposed to allow the sewage biotreatment of the supernatant from the first sedimentation basin to obtain the first water effluent and a second sludge. The term "sludge age" refers to an average residence time of activated sludge, usually expressed as SRT. The calculation formula of SRT is: (effective volume of aeration basin*sludge concentration of mixed liquor in aeration basin)/(volume of discharged sludge per unit of time * sludge concentration of discharged sludge).

According to some embodiments of the sewage treatment apparatus of the present invention, the first aeration basin is disposed to have an aeration time of 0.1-4 h, preferably 0.5-2 h, more preferably 0.5-1.5 h; and the first sedimentation basin is disposed to have a sedimentation time of 0.8-6 h, preferably 1-4 h, more preferably 1-3 h.

According to some embodiments of the sewage treatment apparatus of the present invention, the first aeration basin and the first sedimentation basin are disposed so that the ratio of the aeration time to the sedimentation time is 1:0.5 to 1:6, preferably 1:1 to 1:3, more preferably 1:1.5 to 1:2, most preferably 1:2.

According to some embodiments of the sewage treatment apparatus of the present invention, the treatment section is a device capable of performing sewage biotreatment of the sewage feed in a manner according to Wuhrmann process, A/O process, Bardenpho process, Phoredox process, A2/O process, reversed A2/O process, UCT process, MUCT process, VIP process, OWASA process, JHB process, TNCU process, Dephanox process, BCFS process, MSBR process, SBR process, AB process, oxidation ditch process, biomembrane process, moving bed process or a combination thereof.

According to some embodiments of the sewage treatment apparatus of the present invention, the treatment section comprises a second aeration basin and a second sedimentation basin, the second aeration basin is disposed to allow the aeration treatment of the supernatant from the first sedimentation to obtain a third mixed liquor, and the second sedimentation basin is disposed to allow the sedimentation separation of the third mixed liquor from the second aeration basin to obtain the first water effluent and the second sludge.

According to some embodiments of the sewage treatment apparatus of the present invention, the treatment section further comprises a biologic selection zone, the biologic selection zone is disposed to allow the supernatant form the first sedimentation basin mix with the third mixed liquor from the second aeration basin and/or the second mixed liquor from the second sedimentation basin and enter the second aeration basin.

According to some embodiments of the sewage treatment apparatus of the present invention, the biologic selection zone is disposed so that the residence time of the mixture of the supernatant and the third mixed liquor and/or the second sludge in the biologic selection zone is 0.1-2 h, preferably 0.2-1 h, more preferably 0.3-0.6 h.

According to some embodiments of the sewage treatment apparatus of the present invention, the first stage and the second stage are disposed so that at least part of the second stage is embedded in the internal part of the first stage.

According to some embodiments of the sewage treatment apparatus of the present invention, the first stage and the second stage are disposed so that the first stage surrounds at least part of the second stage.

According to some embodiments of the sewage treatment apparatus of the present invention, the horizontal projection of the first stage is present in a first polygon shape, the projection of the second stage is present in a second polygon shape, and the first polygon and the second polygon share at least one edge. According to some embodiments of the sewage treatment apparatus of the present invention, the first polygon and the second polygon constitute a tetragon, preferably a rectangle.

According to some embodiments of the sewage treatment apparatus of the present invention, the first stage is disposed so that the water level of the sewage feed inlet of the first stage is located at the highest point of the whole first stage, and the water level of the first water effluent outlet of the first stage is located at the lowest point of the whole first stage, so that the sewage feed can flow from the sewage feed inlet to the first water effluent outlet under the effect of gravity.

The inventors of the present invention surprisingly found that the sewage treatment apparatus can stably run for a long term, all of the first sludge can return to the first aeration basin, and all of the second sludge can return to the first aeration basin. In the meantime, the sludge discharge can be substantially eliminated.

The sewage treatment apparatus of the present invention is advantageous in compact structure, small floor area, high treatment efficiency, good water quality, and significant economic benefit.

SPECIFIC MODELS FOR CARRYING OUT THE INVENTION

Some embodiments of the present invention are further illustrated in combination with the drawings, but this is not to limit the protection scope of the present invention.

Figure 1:
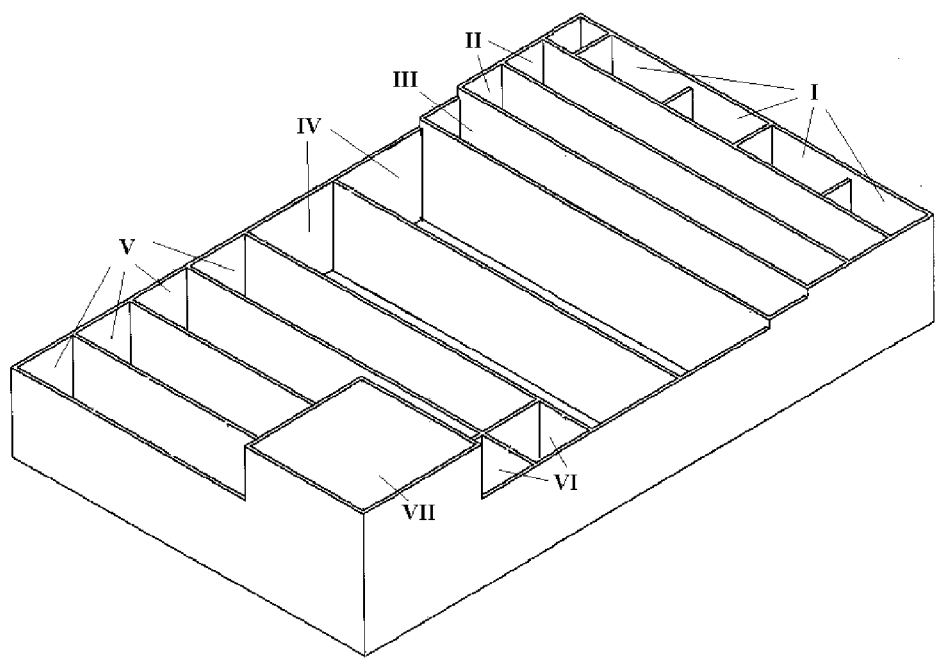
FIG. 1 is a plane sketch of one embodiment of the sewage treatment apparatus of the present invention.

FIG. 1 is a plane sketch of one embodiment of the sewage treatment apparatus of the present invention, in which the whole sewage treatment apparatus is a structure having a planar projection in rectangular shape.

Sewage feed (i.e., water influent in FIG. 1 and FIG. 2) entered a head end of a first aeration basin (I) and mixed with a first sludge from a first sedimentation basin (II) and optionally a second sludge from a second sedimentation basin (IV) to obtain a first mixed liquor, the first mixed liquor was subjected to aeration treatment in the first aeration basin (I) to obtain a second mixed liquor at a tail end of the first aeration basin. The second mixed liquor entered into the first sedimentation basin (II) and was subjected to sedimentation treatment to obtain a first sludge and a supernatant, in which substantially all of the first sludge returned to the head end of the first aeration basin (I), while the supernatant entered into a biologic regulation basin (III). In the biologic regulation basin (III), the supernatant mixed with a part of a second sludge from a second sedimentation basin (IV) and a third mixed liquor from a second aeration basin (V), then entered into the second aeration basin (V) and was subjected to aeration to obtain the third mixed liquor. A part of the third mixed liquor returned to the biologic regulation basin (III). The residual part of the third mixed liquor entered into the second sedimentation basin and was subjected to sedimentation treatment to obtain a first water effluent and the second sludge. A part of the second sludge returned to the biologic regulation basin (III), and the residual part of the second sludge entered into the head end of the first aeration basin (I) and mixed with the sewage feed. The first water effluent entered into a flocculation agent mixing device (VI) and mixed with a flocculation agent, then entered into a flocculation clarification basin (VII) to further improve water quality to obtain a second water effluent (i.e., the water effluent in FIG. 1 and FIG. 2) and a mud. The mud from the flocculation clarification basin (VII) could substantially totally returned to the head end of the first aeration basin (I) and mixed with the sewage feed.

The first aeration basin (I), the biologic regulation basin (III) and the second aeration basin (V) were all long and narrow groove type structures to reduce backmixing and channeling, and one or more of them were equipped with baffle plates to enhance the mixing of solid phase and liquid phase in fluid. The first sedimentation basin (II) and the second sedimentation basin (IV) are also long and narrow groove type structures, which bottom could be equipped with one or more V-shape grooves and one or more sludge collecting tanks to improve the sedimentation effect of sludge.

Figure 3:
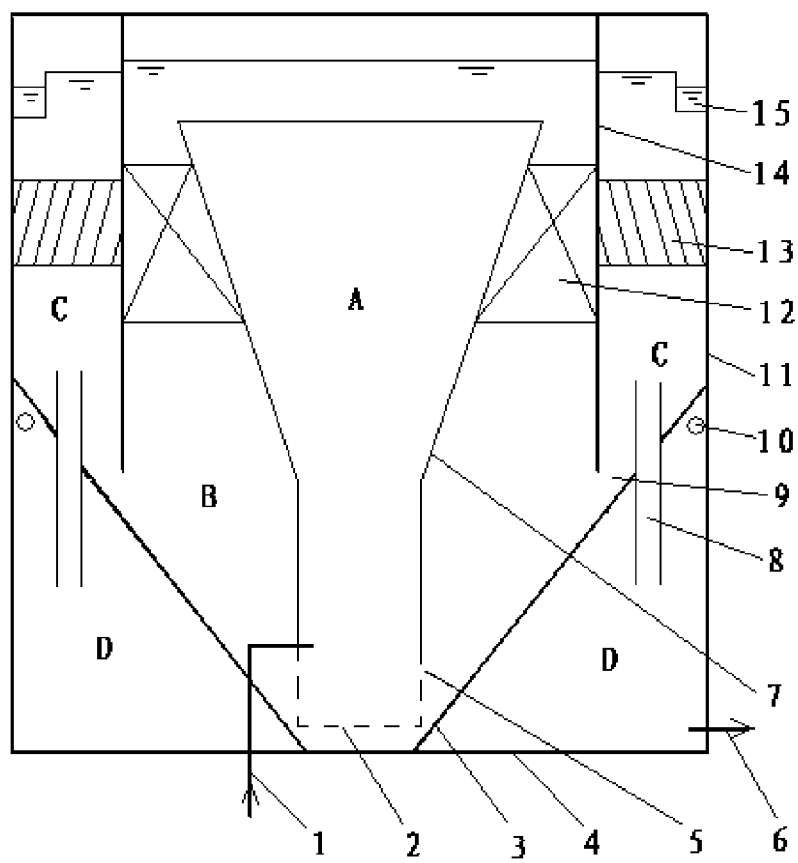
FIG. 3 is a structural diagram of one embodiment of the flocculation clarification device of the sewage treatment apparatus of the present invention.

FIG. 3 is a structural diagram of one embodiment of flocculation clarification basin (VII), which comprises a rotational flow generating device (7), an internal tube (14) surrounding the rotational flow generator (7), an external tube (11) surrounding the internal tube (14), and an inverted cone-shaped tube (3) locating in the external tube (11) and containing the rotational flow generating device (7) and the internal tube (14) in its lower part.

The interior of the rotational flow generating device (7) defines a first flocculation reaction chamber (A). The outer wall of the rotational flow generating device (7) together with the inner wall of the internal tube (17) and a part of the upper surface of the cone-shaped tube (3) define a second flocculation reaction chamber (B). The outer wall of the internal tube (14) together with the inner wall of the internal wall (11) and a part of the upper surface of the cone-shaped tube (3) define a first separation chamber (C). The lower surface of the cone-shaped tube (3) together with the inner wall of the external tube (11) and the bottom (4) define a second separation chamber (D).

An inlet (1) is set at the lower part of the rotational flow generating device (7) to allow the first water effluent containing flocculation agent tangentially enter the rotational flow generating device (7). Inlets (2) and (5) for a mixed liquor of dreg and water are separately set at the bottom and the side water of the lower part of the rotational flow generating device (7) to allow the mixed liquor of dreg and water from the second flocculation reaction chamber (B) enter the rotational flow generating device (7). A plurality of inlets (2) and/or (5) for the mixed liquor of dreg and water can be set (see FIG. 2). In some cases, only one of the inlet (2) or (5) for the mixed liquor of dreg and water is set. The bottom of the rotational flow generating device (7) can also be a part of the bottom (4), and in this case, only one or more inlets (5) for the mixed liquor of dreg and water are set.

Figure 2:
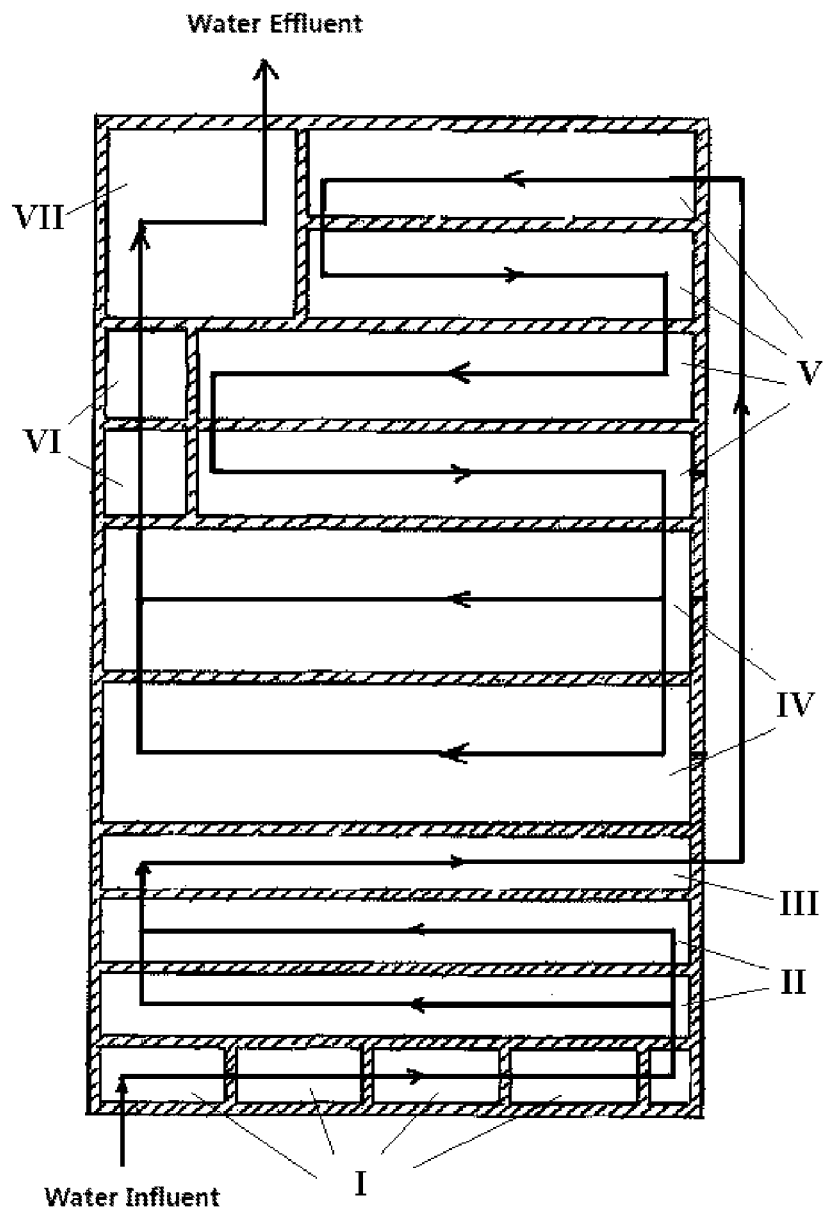
FIG. 2 is a three-dimensional sketch of one embodiment of the sewage treatment apparatus of the present invention.

A channel is set between the superior border of the rotational flow generating device (7) and the inner wall of the internal tube (14), which allows the mixed liquor of dreg and water in the first flocculation reaction chamber (A) enter into the second flocculation reaction chamber (B). A channel (9) is set between the inferior border of the internal tube (14) and the upper surface of the inverted cone-shaped tube (3), which allows the mixed liquor of dreg and water in the second flocculation reaction chamber (B) enter into a first separation chamber (C). The part of the inverted cone-shaped tube (3) as the bottom of the first separation chamber (C) is equipped with a channel (8), which allows the first dreg in the first separation chamber (C) enter into a second separation chamber (D). The channel (8) has an opening in the first separation chamber (C), which is set on the inverted cone-shaped tube, or extends into the interior of the first separation chamber (C) (as shown in FIG. 2). The channel (8) has an opening in the second separation chamber (D), which is set on the inverted cone-shaped tube (3), or extends into the interior of the second separation chamber (D) (as shown in FIG. 2). A clean water discharging tube (10) is set at the upper part of the second separation chamber (D). In some cases, the channel (8) has an opening in the second separation (D) which extends into the middle or bottom part of the second separation chamber (D), and is arranged in a staggered manner with the clean water discharging tube (10) on horizontal plane and/or vertical plane to increase the distance between each other.

A plurality of layers of small eyelet gridding screen (12) is set in the second flocculation reaction chamber (B). A regulation device for regulating the flow rate of the mixed liquor of dreg and water entering the rotational flow generating device (7) is set at the inlet (2) and/or (5) for the mixed liquor of dreg and water, which is for example a flow control valve or a curtain board (not shown) regulating the opening size of the inlet. Inclined tube zone and/or inclined plate zone (13) are set in the first separation chamber (C) to enhance the sedimentation of fine particles so as to ensure the sedimentation effect and clarification efficiency of the clarification basin. A supernatant over-flow well is set at the upper part of the separation chamber (C). The tilt angle of the tube wall of the inverted cone-shaped tube (3) is about 30° to 60°, for example about 45°. The internal tube (14), the external tube (11) and the inverted shaped tube (3) separately have a cross-section in square shape and/or round shape. A dreg discharging tube (6) is set at the lower part of the external tube (11).

When the flocculation clarification basin (VII) was used for improve water quality of the first water effluent, firstly, at least part of the first effluent water was mixed with a flocculation agent in a stirring tank, then mixed with the residual part of the first water effluent in a static mixer to obtain a first water efflent containing flocculation agent, the obtained first water effluent containing flocculation agent was introduced into the inlet (1) of the flocculation clarification device as shown in FIG. 3. The first water effluent containing flocculation agent was mixed with at least part of the mixed liquor of dreg and water from the second flocculation reaction chamber (B) and passed through in turn the first flocculation reaction chamber (A) and the second flocculation reaction chamber (B) for conducting flocculation reaction. The residual mixed liquor of dreg and water from the second flocculation reaction chamber (B) passed through the channel (9) and entered into the first separation chamber (C) for conducting dreg-water separation to obtain a first clean water and a first dreg. The first clean water was discharged from the over-flow well (15). A first part of the first dreg entered into the second separation chamber (D), and a second part thereof returned and entered into the second flocculation reaction chamber (B) and mixed with the mixed liquor of dreg and water therein. The first dreg entered into the second separation chamber (D) was subjected to dreg-water separation to obtain a second clean water and a second dreg, in which the second clean water was discharged from the clean water tube (1), and the second dreg was discharged from the dreg discharging tube (6).

During running, by regulating the flow rates of the first water effluent, the first clean water, the second clean water and the second dreg, the dreg-water interface in the first separation chamber (C) was substantially at the position of the opening of the channel (8) in the first separation chamber (C), i.e., the lowest dreg-water interface. Thus, when the dreg-water interface in the first separation chamber (C) raised, the first dreg entered into the second separation chamber (D) increased while the clean water decreased; and when the dreg-water interface in the first separation chamber (C) dropped, the first dreg entered into the second separation chamber (D) decreased and the clean water increased. Both the clean water and the first dreg entered into the second separation chamber (D) were subjected to dreg-water separation to obtain the second clean water and the second dreg. Hence, whatever the changes of the water quality of the first water effluent and the operation conditions such as temperature were, it could be treated with the flocculation clarification apparatus as shown in FIG. 3. Since sufficient dreg-water separation was performed in the second separation chamber (D), the obtain second clean water had not only high yield but also good water quality. In addition, due the sufficient dreg-water separation in the second separation chamber, the consumption of the process water caused by discharging the second dreg was also small, i.e., the water content of the second dreg was relatively low.

The present invention is described with the above example, but it should be understood that the present invention is not limited to these specific embodiments. Those skilled in the art can make various modifications and changes to the present invention, and all of these modifications and changes belong to the protection scope of the present invention.

What is claimed is:

1. A sewage treatment apparatus, comprising:
    a primary stage for treating a sewage feed to obtain a first water effluent, and
    a secondary stage for treating the first water effluent to obtain a second water effluent,
        wherein the secondary stage comprises a mixing device for mixing the first water effluent with a flocculation agent to obtain the first water effluent containing flocculation agent, and a flocculation clarification device, the flocculation clarification device comprises a flocculation reaction chamber allowing the entrance and flocculation reaction of the first water effluent containing flocculation agent to form a mixed liquor of dreg and water, a first separating chamber allowing the entrance and separation of the mixed liquor of dreg and water from the flocculation reaction chamber to obtain a first part of the second water effluent and a first dreg, and a second separation chamber allowing the entrance and separation of a first part of the first dreg to obtain a second part of the second water effluent and a second dreg, wherein the flocculation reaction chamber comprises: a first flocculation reaction chamber and a second flocculation reaction chamber, wherein the first flocculation reaction chamber is disposed to allow the entrance and flocculation reaction of the raw sewage containing flocculation agent and the first part of the mixed liquor of the second flocculation reaction chamber to form the mixed liquor of the first flocculation reaction chamber, the second flocculation reaction chamber is disposed to allow the entrance and flocculation reaction of the mixed liquor of the first flocculation reaction chamber and a second part of the first dreg to form the mixed liquor of the second flocculation reaction chamber, and the second part of the mixed liquor of the second flocculation reaction chamber as a mixed liquor of dreg and water enters into the first separation chamber, wherein the first flocculation reaction chamber is a rotational flow generator comprising a tangential inlet that allows the sewage containing flocculation agent to enter and to form a rotational flow, an opening that allows the first part of the mixed liquor of the second flocculation reaction chamber to enter, and a reaction chamber in which the flocculation reaction occurs, wherein the tangential inlet and the opening are disposed to allow the sewage containing flocculation agent and the first part of the mixed liquor of the second flocculation reaction chamber to mix in the rotational flow generator.

2. The sewage treatment apparatus according to claim 1, wherein the flocculation clarification device further comprises:

one or more first dreg discharging channels fluidly connecting the first separation chamber and the second separation chamber to allow the entrance of a first part of the first dreg into the second separation chamber, and one or more first dreg returning channels fluidly connecting the first separation chamber and the flocculation reaction chamber to allow the entrance of a second part of the first dreg into the flocculation reaction chamber, wherein in the first separation chamber, the inlet of the first dreg discharging channels is at a position higher than the inlet of the first dreg returning channels.

3. The sewage treatment apparatus according to claim 2, wherein the second separation chamber has one or more channels for discharging a second part of the second water effluent so as to allow the second part of the second water effluent to be discharged from the second separation chamber, the relative position between the inlet of the channels for discharging the second part of the second water effluent and the outlet of the first dreg discharging channels in the second separation chamber is disposed so that the suspended solids in the first part of the first dreg are subjected to sufficient sedimentation to obtain the second part of the second water effluent that substantially does not contain suspended solids.

4. The sewage treatment apparatus according to claim 2, wherein the first dreg returning channels allow the mixed liquor of dreg and water in the flocculation reaction chamber to enter into the first separation chamber.

5. The sewage treatment apparatus according to claim 1, wherein the first separation chamber and the second separation chamber are disposed to allow the first part of the first dreg to enter into the second separation chamber under gravity effect.

6. The sewage treatment apparatus according to claim 1, a volume of the second separation chamber is about equal to or greater than the volume of the first separation chamber.

7. The sewage treatment apparatus according to claim 1, wherein the first flocculation reaction chamber is a water ejector, wherein the water ejector comprises a nozzle and a throat to allow the sewage containing flocculation agent and the first part of the mixed liquor of the second flocculation reaction chamber to enter and to be mixed, and a reaction chamber to allow flocculation reaction.

8. The sewage treatment apparatus according to claim 1, wherein one or more kinds of grid and/or packing material are set in the first flocculation reaction chamber and/or the second flocculation reaction chamber.

9. The sewage treatment apparatus according to claim 1, one or more guide vanes are set in the first flocculation reaction chamber and/or the second flocculation reaction chamber.

10. The sewage treatment apparatus according to claim 1, wherein the second separation chamber is disposed to locate below the first separation chamber and the second flocculation reaction chamber.

11. The sewage treatment apparatus according to claim 1, wherein one or more inclined pipe zones and/or inclined plate zones are set in the first separation chamber and/or the second separation chamber.

12. The sewage treatment apparatus according to claim 1, wherein the primary stage is a device capable of performing sewage biotreatment of the sewage feed in a manner according to Wuhrmann process, A/O process, Bardenpho process, Phoredox process, $A^2/O$ process, reversed $A^2/O$ process, UCT process, MUCT process, VIP process, OWASA process, JHB process, TNCU process, Dephanox process, BCFS process, MSBR process, SBR process, AB process, oxidation ditch process, biomembrane process, moving bed process or a combination thereof.

13. The sewage treatment apparatus according to claim 1, wherein the primary stage comprises a pretreatment section and a treatment section, the pretreatment section comprises a first aeration basin and a first sedimentation basin, wherein the first aeration basin is disposed to allow the sewage feed mixed with a first sludge from the first sedimentation basin, and optionally a second sludge from the treatment section and optionally the second dreg from the secondary stage at a first end of the first aeration basin to obtain a first mixed liquor, and allow the aeration of the first mixed liquor to obtain a second mixed liquor at a second end of the first aeration basin; the first sedimentation basin is disposed to allow the separation of the second mixed liquor from the first aeration basin to obtain a supernatant and a first sludge, and allow at least part of the first sludge return to the first end of the first aeration basin to have a sludge age of greater than 50 days;

and the treatment section is disposed to allow the sewage biotreatment of the supernatant from the first sedimentation basin to obtain the first water effluent and a second sludge.

14. The sewage treatment apparatus according to claim 13, wherein the first aeration basin is disposed to have an aeration time of 0.1 to 4 h; and the first sedimentation basin is disposed to have a sedimentation time of 0.8 to 6 h.

15. The sewage treatment apparatus according to claim 13, wherein the first aeration basin and the first sedimentation basin are disposed so that the ratio of the aeration time to the sedimentation time is 1:0.5 to 1:6.

16. The sewage treatment apparatus according to claim 13, wherein the treatment section is a device capable of performing sewage biotreatment of the sewage feed in a manner according to Wuhrmann process, A/O process, Bardenpho process, Phoredox process, $A^2$/O process, reversed $A^2$/O process, UCT process, MUCT process, VIP process, OWASA process, JHB process, TNCU process, Dephanox process, BCFS process, MSBR process, SBR process, AB process, oxidation ditch process, biomembrane process, moving bed process or a combination thereof.

17. The sewage treatment apparatus according to claim 13, wherein the treatment section comprises a second aeration basin and a second sedimentation basin, the second aeration basin is disposed to allow the aeration treatment of the supernatant from the first sedimentation to obtain a third mixed liquor, and the second sedimentation basin is disposed to allow the sedimentation separation of the third mixed liquor from the second aeration basin to obtain the first water effluent and the second sludge.

18. The sewage treatment apparatus according to claim 17, wherein the treatment section further comprises a biologic selection zone, the biologic selection zone is disposed to allow the supernatant form the first sedimentation basin mix with the third mixed liquor from the second aeration basin and/or the second mixed liquor from the second sedimentation basin and enter the second aeration basin.

19. The sewage treatment apparatus according to claim 18, wherein the biologic selection zone is disposed so that the residence time of the mixture of the supernatant and the third mixed liquor and/or the second sludge in the biologic selection zone is 0.1 to 2 h.

20. The sewage treatment apparatus according to claim 1, wherein the first stage is disposed so that the water level of the sewage feed inlet of the first stage is located at the highest point of the whole first stage, and the water level of the first water effluent outlet of the first stage is located at the lowest point of the whole first stage, so that the sewage feed can flow from the sewage feed inlet to the first water effluent outlet under the effect of gravity.

* * * * *